April 11, 1939.  W. H. BRANDT  2,154,261
IMMERSION HEATER
Filed Dec. 17, 1937
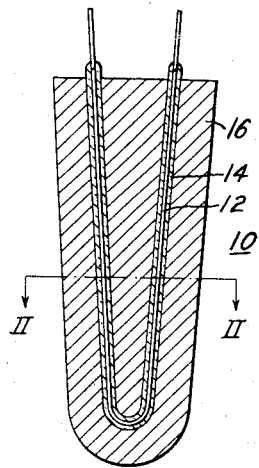
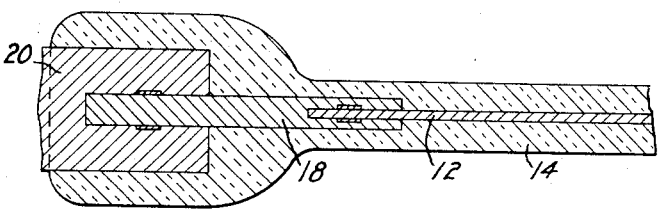
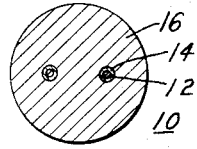
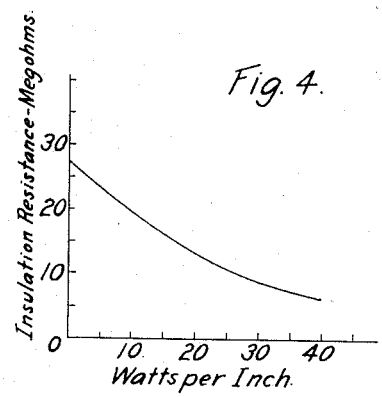
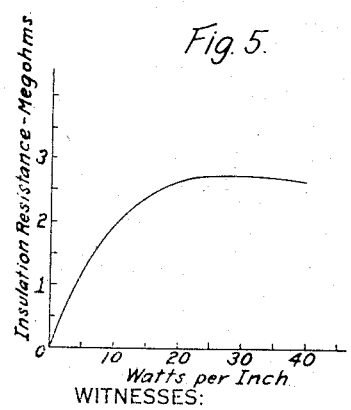
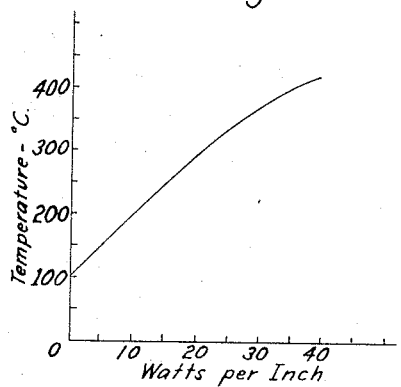
WITNESSES:
Wm. B. Sellers
James K. Ely
INVENTOR
Weldon H. Brandt
BY
Ezra N. Savage
ATTORNEY Patented Apr. 11, 1939

2,154,261

UNITED STATES PATENT OFFICE 2,154,261

IMMERSION HEATER

Weldon H. Brandt, Wilkinsburg, Pa., assignor to Westinghouse Electric & Manufacturing Company, East Pittsburgh, Pa., a corporation of Pennsylvania Application December 17, 1937, Serial No. 180,396

3 Claims. (Cl. 219—41)

This invention relates to electric heaters and particularly to the immersion type of electric heater and the process of making the same.

In electric immersion heaters, the heating elements are usually composed of metals or alloys which are resistant to oxidation at high temperatures. These metals or alloys are expensive and in time are affected by oxidation at the high operating temperatures. It is, therefore, desired to produce a relatively inexpensive immersion heater that is unaffected by oxidation.

An object of this invention is the provision of an electric immersion heater that is unaffected by oxidation.

Another object of this invention is to produce an electric immersion heater that is electrically insulated and protected from oxidation.

A further object of this invention is the provision of an electric immersion heater that is capable of producing a high amount of heat per unit length of the element without being affected by oxidation.

Another object of this invention is the provision of a metallic coating on an electrically insulated heating element to protect it against physical shocks and maintain the insulated heating element free from the effects of liquid when immersed therein.

A further object of this invention is the provision of an electric immersion heater having a high insulation resistance.

A further object of this invention is the provision of a process for making a protected electrically insulated immersion heater that is capable of producing a high amount of heat per unit length of the element and is resistant to oxidation.

Other objects of this invention will become apparent from the following description when taken in conjunction with the accompanying drawing, in which:

Figure 1 is a view in section of an immersion heater constructed in accordance with this invention;

Fig. 2 is a view in section of the heater taken along the line II—II of Fig. 1;

Fig. 3 is an enlarged view in section of the connection between a lead and the heating element;

Fig. 4 is a graph, the curve of which illustrates the insulation resistance of a particular heater constructed in accordance with this invention;

Fig. 5 is a graph, the curve of which illustrates the insulation resistance of a thousand-watt heater at different ratings; and, Fig. 6 is a graph, the curve of which illustrates the temperature developed in the heating element at different ratings.

Referring to the drawing and Figs. 1 and 2 in particular, this invention is illustrated with reference to an immersion heater 10. In constructing the immersion heater, a metal such as tungsten, molybdenum or the alloy known to the trade as "Kovar" is worked to a desired size such as a fine wire for use as the heating element. "Kovar" is an iron base alloy composed essentially of nickel, cobalt and iron with the nickel plus cobalt content ranging from 40 to 55% of the alloy when the cobalt content ranges from 12 to 33% and the balance substantially iron, as described and claimed in Patent No. 1,942,260, issued January 2, 1934, to Howard Scott, and assigned to the assignee of this invention. The wire is formed into the shape of the heating element 12 as desired having a single loop as illustrated, or a plurality of loops, depending upon the length of wire employed and the size and rating of the heater to be produced.

Since the metallic heating element is to be operated in liquids at high temperatures, it is desired to prevent oxidation of the metal. In order to protect the metallic heating element, the protective material must have a high electrical insulating value, good heat conductivity, and corrosion resistance. Glass is desirable for this purpose, since it has a better combination of these properties than other known materials. In employing glass, however, care should be exercised in selecting a glass which has approximately the same coefficient of expansion as the metal utilized as the heating element. By employing such a glass, it is possible to seal or intimately bond a thin film 14 of the glass to the metallic heating element and thereby secure a reduction in loss of the heat conductivity between the conductor and the protective coating.

In a particular embodiment of this invention, a "Kovar" heating element 10 inches long having a diameter of .01 inch and consisting of about 18% by weight of cobalt, 28% by weight of nickel, and 53.5% by weight of iron is readily sealed into a layer 14 of glass having approximately the same coefficient of expansion. The sealing may be accomplished by any of the known glass-to-metal sealing processes.

The particular glass selected as the protective insulating material is a boro-silicate glass. Boro-silicate glass is a higher melting glass than lead glass, has a coefficient of expansion approximating that of molybdenum, tungsten and "Kovar", readily wets these metals, and may be sealed thereto. The glass employed in this embodiment consisted of about 64% by weight of $SiO_2$, about 23% by weight $B_2O_3$, about 7% by weight NaO, and about 5% by weight $Al_2O_3$. Other examples of seals between different boro-silicate glasses and different "Kovar" alloys employed therewith within the range given hereinbefore and suitable for use in accordance with this invention, may be readily ascertained by reference to Patent No. 2,062,335, issued December 1, 1936, to Howard Scott, and assigned to the assignee of this invention.

In applying the glass to the heating element, it is desired to maintain the layer of glass as thin as commercially possible and yet maintain a high insulation resistance. Experiments have proven that a layer of boro-silicate glass having a radius of only .03 inch is sufficient to meet the requirements without increasing operating temperatures or effecting a substantial lag in heating when employed with the .01 inch diameter heating element of "Kovar".

In order to protect the glass coating from devitrification and attack by boiling water when immersed therein, and to maintain the glass in intimate contact with the heating element, thereby maintaining its insulating relationship, a coating 16 of metal is applied to the glass coated heating element. The good heat conducting and corrosion resistant metal, aluminum, is satisfactory for this purpose where care is employed in making the heater although it is to be preferred, because of the ease in manufacturing technique, to utilize a metal or alloy having a melting point near or lower than the softening point of the glass even though it has a lower thermal conductivity.

A zinc die casting metal identified on the open market as Zamak No. 3 and which consists of from 3.9 to 4.3% of aluminum, less than .075% of each of the elements copper, magnesium, lead, cadmium, iron and tin with the balance zinc and which has a lower melting point than the softening point of the boro-silicate glass, is satisfactory for this purpose. Where the metal employed, such as the zinc die casting metal, is not of itself corrosion resistant, it is necessary to provide a coating of a corrosion resistant metal such as copper about the glass protecting coat of metal. Such corrosion resistant layers of metal may be formed on the poor corrosion resistant metal by dipping the metal covered glass coated heater into a molten bath of the corrosion resistant metal and then withdrawing it, or the corrosion resistant layer may be formed by casting the die casting metal about the glass coated heating element directly into a tube of the corrosion resistant metal which has been previously formed to the desired shape of the heater. A good bond between the two metals is effected in either case.

Experiments have proven that the thickness of the coating of metal applied to the glass coated heating element and the thermal conductivity of the metal are substantially immaterial, since the temperature drop in the metal is at most not more than a few percent. The protective coating of metal may, therefore, be of any thickness desired in accordance with the conditions under which it is to operate. Where the heater is to operate in hot water or other similar liquids, a thick coating of metal is used in order to increase the surface area of the heater and thus decrease lime or scale formation on the heater.

In a preferred process for applying the protective coating 16 of metal to the glass coated heating element, the metal is melted in a suitable mold, not shown, preferably of graphite and of the desired shape and size of the heater to be produced. The graphite mold is tapered or split to facilitate removal of the heater. When the metal is melted, the glass covered heating element is heated to the softening point of the glass to prevent cracking of the glass and then inserted into the molten metal contained in the mold. After positioning the heating element in the molten metal, it is maintained in that position by any suitable means, and the mold is permitted to cool, preferably from the bottom of the casting upwards in order to minimize shrinkage cavities, causing the metal therein to solidify in intimate contact with the glass coated heating element.

In a modification of this invention, the metal may be applied to the glass coated heating element by electroplating as will be understood by those skilled in the art. However, electroplating the coating is not as satisfactory as the casting process described hereinbefore in that there is a tendency for the deposited metal to be porous. This modification is useful in applications where the requirements of low heat capacity in the element outweigh the disadvantages of a porous metal coating.

A particular metal clad immersion heater of circular cross-section and having an overall size tapering from ½ inch diameter at one end to ⅞ inch diameter at the other end, 6 inches long and containing 10 inches of .01 inch diameter "Kovar" covered with boro-silicate glass having a radius of .03 inch when subjected to a current of 12.7 amperes at 75 volts, operated on a power input of 950 watts or 95 watts per inch of wire for several minutes without failure. Under continued intermittent operation at 20 watts per inch, this heater withstood a lifetime test of 950 hours in boiling water without failure.

Referring to the drawing, the curve of Fig. 4 illustrates the insulation resistance of the particular immersion heater sealed in the glass and embedded in aluminum as described hereinbefore. An examination of this curve reveals that the insulation resistance even at 40 watts per inch is quite high, being about 6.5 megohms. From this curve, the insulation resistance of a thousand-watt heater made of the same sized heating element, sealed in the same glass, and embedded in aluminum may be readily calculated. The curve of Fig. 5 illustrates the insulation resistance of a thousand-watt heater operating at different ratings ranging from 5 to 40 watts per inch. As will be evident from this curve, a heater element of this type has a satisfactorily high insulation resistance.

The curve of Fig. 6 illustrates the temperature developed at the different ratings ranging from 5 to 40 watts per inch, as observed under tests. The highest operating temperature of 414° C. at 40 watts per inch, as illustrated, is below the 450° C. annealing temperature of the glass, and devitrification of the glass will, therefore, not occur from the heat developed.

In forming the heater, it is found that hot spots sometimes occur at the termination of the glass-to-metal seal where a heavy bead of glass is usually deposited. This is because the wire temperature of the fine wire which extends into the heavy bead is far greater than at points where the covering is thin. Where this occurs, if the temperature is sufficiently high, bubbling occurs and a further increase in temperature is occasioned until finally the wire melts.

In order to overcome this disadvantage of the glass bead at the end of the seal between the glass and metallic heating element, the lead-in joint illustrated in Fig. 3 may be employed. In this embodiment of the joint, an intermediate thin strip 18 of "Kovar" is employed to join the thin heating element 12 and the lead 20 from the heating element and is secured thereto as by spot welding. This narrow thin strip of "Kovar" is so employed to carry the current far enough from the lead within the glass bead that the glass covering about the end of the heating element is of the usual value and uniform with the rest of the heating element. Since the cross-section of the intermediate strip 18 within the bead is greater than that of the heating element, the heat developed in the strip is less than the failing point of the alloy employed.

Immersion heaters produced by this invention compare favorably with prior art immersion heaters. Conduction of heat away from the wire is obtained at a high rate, thus permitting a high output of heat in watts per inch. In comparing the physical characteristics of the heater, it is evident that the metal protected glass coated heating element is capable of withstanding physical shocks during handing and of withstanding the corrosion attack of boiling water when immersed therein. Further in a direct comparison with immersion heaters now on the market, it is found that for a thousand-watt heater produced in accordance with this invention, the volume of metal required for the heating element is from .3 to 2% by weight of that of the commercial heaters. It is also found that the length of the heating element of the present invention is from 8 to 22 times less than that of the prior art heater elements. The advantages of the heat capacity and space requirements of the present heater are apparent.

Although this invention has been described with reference to a particular embodiment thereof, it is, of course, not to be limited thereto except insofar as is necessitated by the prior art and the scope of the appended claims.

I claim as my invention:

1. An electric immersion heater comprising, a metallic heating element, a coating of boro-silicate glass having a coefficient of expansion approximating that of the metal of the heating element sealed to the heating element for insulating it, and a coating of metal over the glass coating to protect it from physical shocks and the action of liquids when immersed therein, the metal coating being cast about the glass coated heating element.

2. An electric immersion heater comprising a metallic heating element composed essentially of an iron base alloy having a nickel plus cobalt content of between 40 to 55% with the cobalt ranging from about 12 to 33%, a coating of a boro-silicate glass sealed to the heating element to electrically insulate it, and a coating of metal over the glass coated heating element to protect it from physical shocks and the chemical action of liquids when immersed therein, the metal coating being cast about the glass coated heating element.

3. An electric immersion heater comprising, a metallic wire heating element consisting of about 18% by weight of cobalt, about 28% by weight of nickel and about 54% by weight of iron, a coating of glass consisting of about 64% by weight of $SiO_2$, about 23% by weight of $B_2O_3$, about 7% by weight of $NaO$ and about 5% by weight of $Al_2O_3$ sealed to the heating element to electrically insulate it, and a coating of metal over the glass to protect it from physical shocks and the action of liquids when immersed therein, the metal coating being cast about the glass coated heating element.

WELDON H. BRANDT.